United States Patent
Yabe et al.

[19]

[11] Patent Number: 5,947,253
[45] Date of Patent: Sep. 7, 1999

[54] BALANCER FOR DAMPER IN LOCKUP CLUTCH

[75] Inventors: Hiroshi Yabe; Yoshio Kinoshita, both of Shizuoka-ken, Japan

[73] Assignee: NSK-Warner K.K., Tokyo, Japan

[21] Appl. No.: 09/110,079

[22] Filed: Jul. 2, 1998

[30] Foreign Application Priority Data

Jul. 4, 1997 [JP] Japan .................................. 9-215427

[51] Int. Cl.⁶ .................................................. F16D 13/58
[52] U.S. Cl. .................... 192/110 R; 192/3.29; 74/573 R
[58] Field of Search .................... 192/3.28, 3.29, 192/70.17, 110 R, 212; 74/573 R

[56] References Cited

U.S. PATENT DOCUMENTS

| | | | |
|---|---|---|---|
| 4,611,702 | 9/1986 | Kayakabe et al. | 192/110 R |
| 4,738,344 | 4/1988 | Maruyamano et al. | 192/110 R X |
| 4,778,040 | 10/1988 | Kabayama | 192/110 R |
| 4,890,706 | 1/1990 | Miura et al. | 192/3.29 X |
| 5,259,269 | 11/1993 | Swenson, Sr. | 74/573 R |
| 5,447,218 | 9/1995 | Tauvron | 192/110 R |

FOREIGN PATENT DOCUMENTS 63-175437  11/1988  Japan .
6-193706   7/1994   Japan .

*Primary Examiner*—Charles A Marmor
*Assistant Examiner*—Saul Rodriguez
*Attorney, Agent, or Firm*—Evenson, McKeown, Edwards & Lenahan, PLLC

[57] ABSTRACT

Disclosed is a balancer for a damper in a lock-up clutch. An unbalance-correcting weight which is to be mounted on a retainer plate of the lockup clutch is in a folded form of an E shape formed of a central insert portion and riding portions located on opposite sides of the central insert portion. The retainer plate is provided with a raised portion formed therein. The unbalance-correcting weight is mounted on the retainer plate by inserting the insert portion outwardly in a radial direction between a piston of the lock-up clutch and the raised portion of the retainer plate.

2 Claims, 8 Drawing Sheets

BALANCER FOR DAMPER IN LOCKUP CLUTCH

BACKGROUND OF THE INVENTION a) Field of the Invention

This invention relates to a balancer for a damper in a lockup clutch suitable for use in a torque converter.

b) Description of the Related Art

Figure 16:
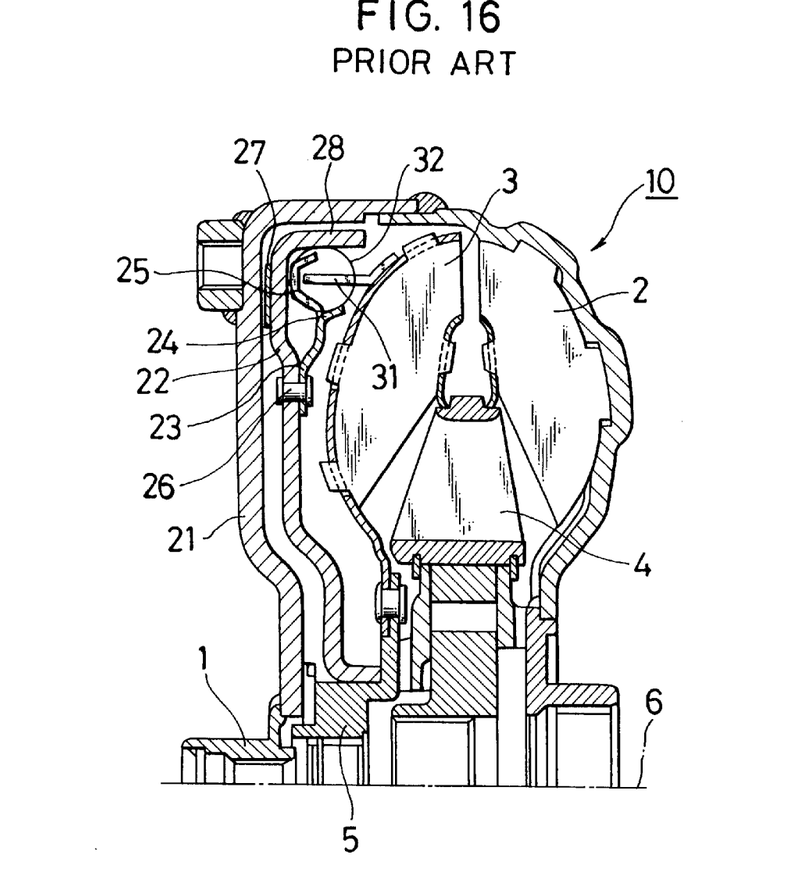
FIG. 16 is a cross-sectional view showing the construction of a torque converter.
Figure 17:
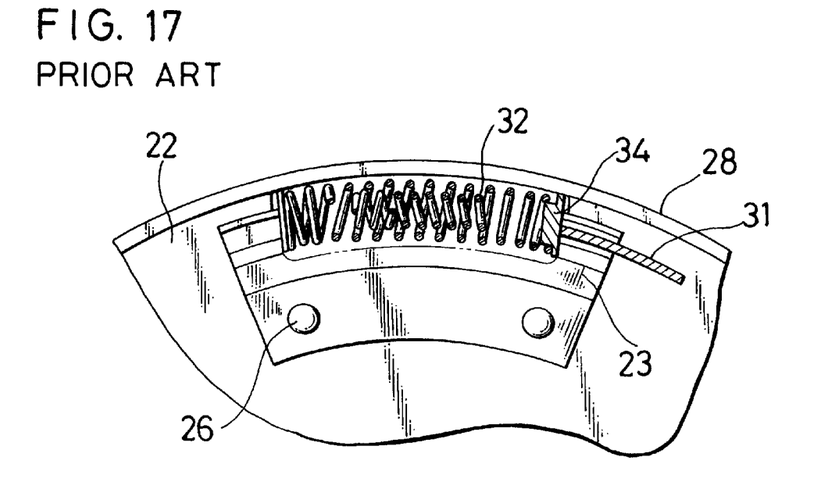
FIG. 17 is a fragmentary front view of a damper portion of the torque converter.

To facilitate the understanding of the present invention, reference is first had to FIGS. 16 and 17 of the accompanying drawings, in which FIG. 16 is a cross-sectional side view of an illustrative basic construction of a torque converter and FIG. 17 is an enlarged view of a damper section of the torque converter. In these drawings, there are shown a torque converter main body 10, an input shaft 1, a pump 2, a turbine 3, a stator 4, a turbine hub 5, a central axis 6, a power input casing 21, a clutch piston 22, retainer plates 23 fixed on the piston 22 by rivets 26, and tabs 24 each located on a radially inner side of a corresponding spring 32 which is in turn arranged on a radially inner side of an outer peripheral flange 28 of the piston 22. Each of these tabs 24 has been formed by radially slitting an outer peripheral portion of its corresponding retainer plate 23 at two locations apart from each other to divide the outer peripheral portion into a central part and side parts, with which the central part is flanked, and then bending the central part in a direction toward the turbine 3. Designated at numeral 25 are spring end face support members. Each of these spring end support members 25 has been formed by bending one of the side parts of the outer peripheral portion of the corresponding retainer plate 23 into a turned square U-shape with the open face of the U rendered broader and directed toward the turbine 3. There are also shown a friction member 27 of the clutch, a driven plate 31, and spacers 34 arranged on opposite sides of the spring 32.

Since the technology of torque converters is well known, its detailed description is omitted herein. It is however to be noted that, when an input shaft and an output shaft become equal in rpm, occurrence of a slip cannot be avoided between fluid couplings. To cope with this potential problem, a lockup clutch is arranged. When a hydraulic pressure is applied on a right side of the piston 22 as viewed in FIG. 16 and the piston 22 of the clutch is hence brought into contact under pressure with the input casing 21, the piston 22 and the input casing 21 are connected directly with each other. Resulting rotation of the piston 22 is transmitted to the driven plate 31 via the spring 32. Since the driven plate 31 is fixed on the turbine 3, the input casing 21 and an output shaft are directly connected with each other via a damper which includes the spring 32. This has made it possible to avoid any slip (FIG. 17 shows a double coil spring as an example of the spring 32 but, needless to say, the spring can be of any desired type).

A lock-up clutch equipped with such dampers must be kept balanced dynamically during rotation. However, no balancing hole can be formed through the piston because pressures are applied on both sides of the piston.

Figure 13:
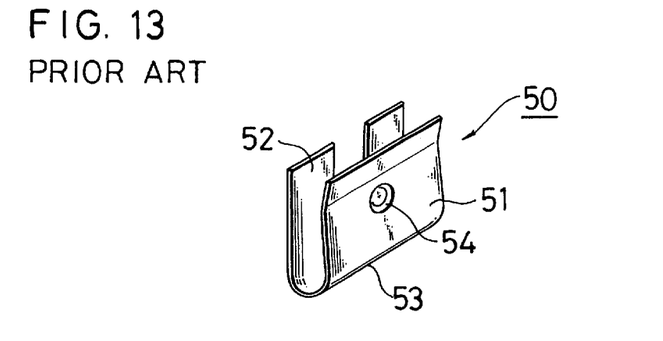
FIG. 13 is a perspective view of a conventional weight.
Figure 14:
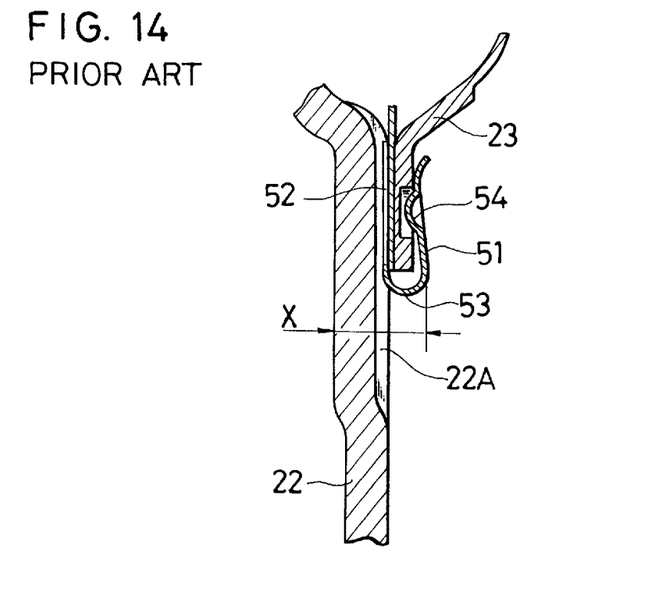
FIG. 14 is a cross-sectional view showing a mounted state of the conventional weight.

It was therefore proposed to form a balancing weight of such a folded clip type as shown in FIG. 13 and to bring it into fitting engagement with the retainer plate outwardly in a radial direction. Namely, this conventional clip-type weight designated at numeral 50 is formed of a front portion 51, an insert portion 52 as a back wall, and a folded portion 53. As is illustrated in FIG. 14, the clip-type weight 50 is mounted by inserting the insert portion 52 behind a back wall of the retainer plate 23. Designated at numeral 54 is a dowel which is brought into fitting engagement with a hole or recess in the retainer plate.

A balancer making use of the conventional weight of the folded clip type requires a substantial mounting space, and its insertion is difficult due to high spring force.

SUMMARY OF THE INVENTION

With the foregoing in view, the present invention has as a primary object thereof the provision of a balancer for a damper in a lock-up clutch, which can resolve or at least lessen the above-mentioned problems.

In one aspect of the present invention, there is thus provided a balancer for a damper in a lock-up clutch. An unbalance-correcting weight which is to be mounted on a retainer plate of the lockup clutch is in a folded form of an E shape formed of a central insert portion and riding portions located on opposite sides of the central insert portion. The retainer plate is provided with a raised portion formed therein. The unbalance-correcting weight is mounted on the retainer plate by inserting the insert portion outwardly in a radial direction between a piston of the lock-up clutch and the raised portion of the retainer plate.

Owing to the above-described construction, the balancer according to the present invention permits an easy change to the weight level of its weight itself and moreover, facilitates insertion of the weight while assuring prevention of falling-off. In addition, the balancer requires smaller mounting space. Further, radial centrifugal force can be borne at the folded portion, and the raised portion can prevent the weight from being displaced in an angular direction.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
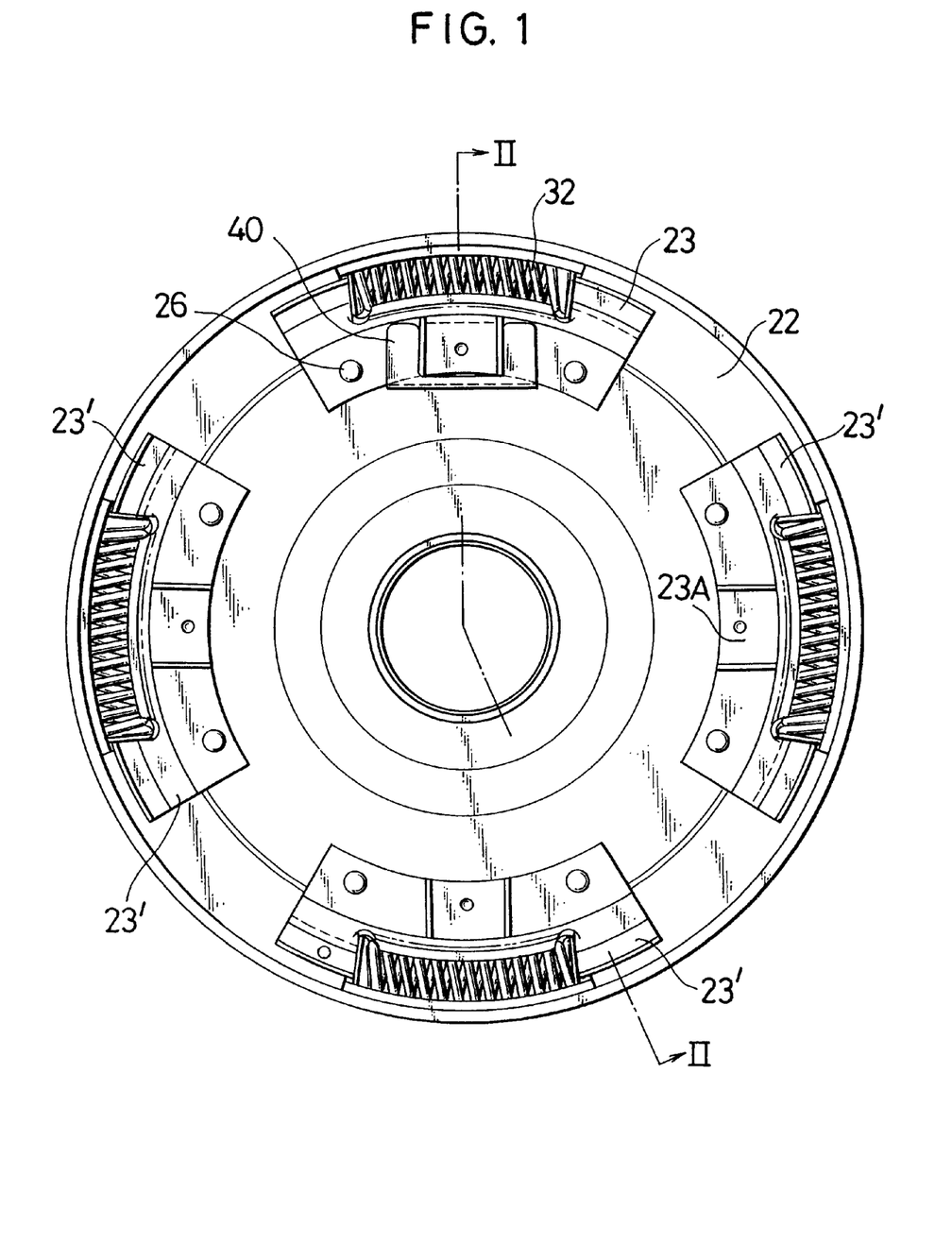
FIG. 1 is a front view of a piston of a lock-up clutch, in which the piston is provided with a balancer according to the present invention.
Figure 2:
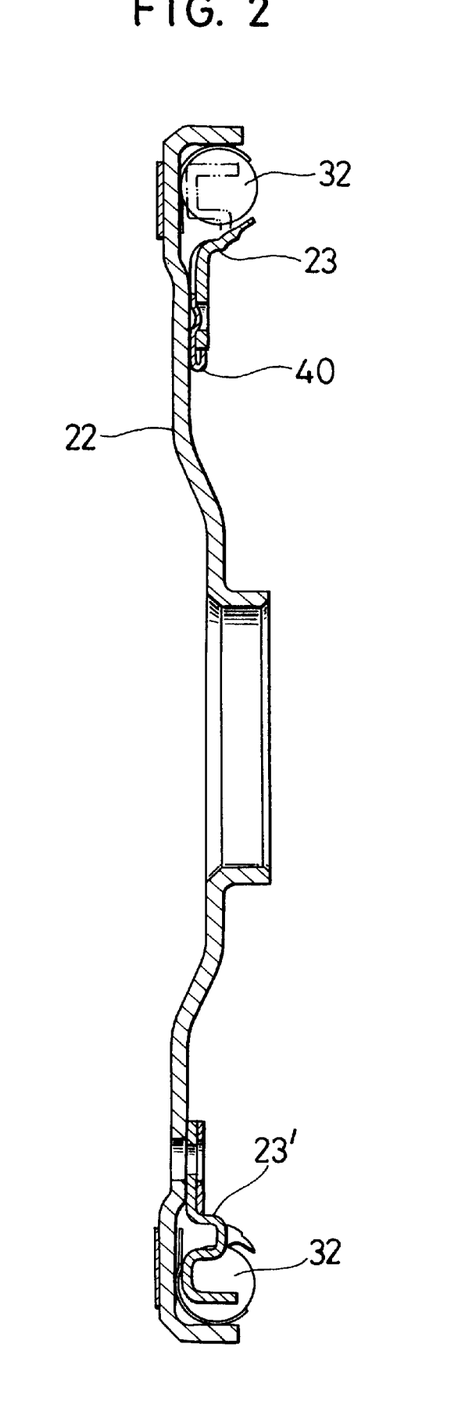
FIG. 2 is a cross-sectional view taken in the direction of arrows II—II of FIG. 1.
Figure 3:
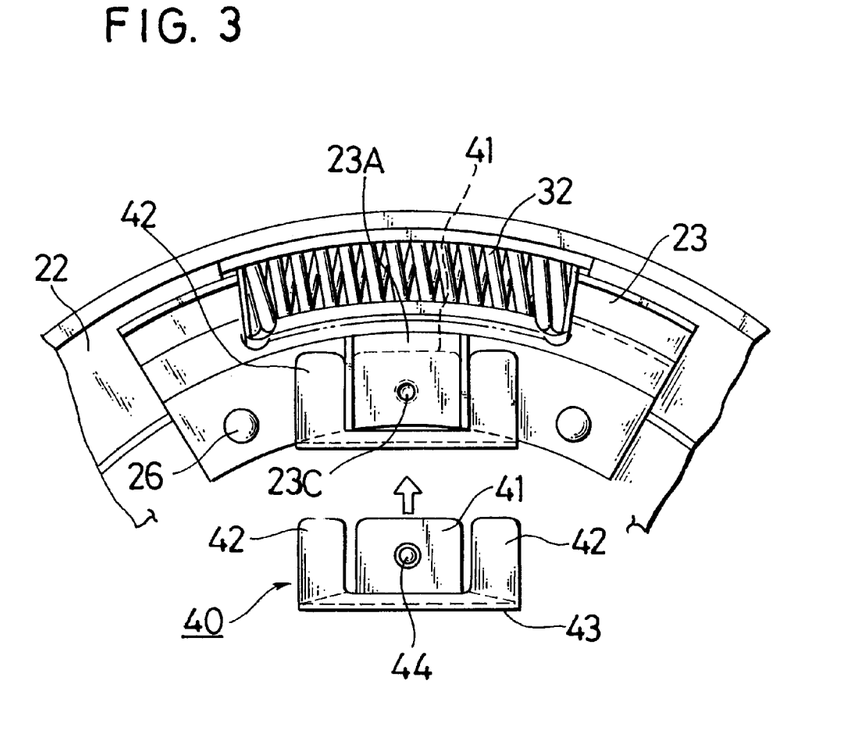
FIG. 3 is a fragmentary front view of the piston, illustrating how a weight is mounted.
Figure 4:
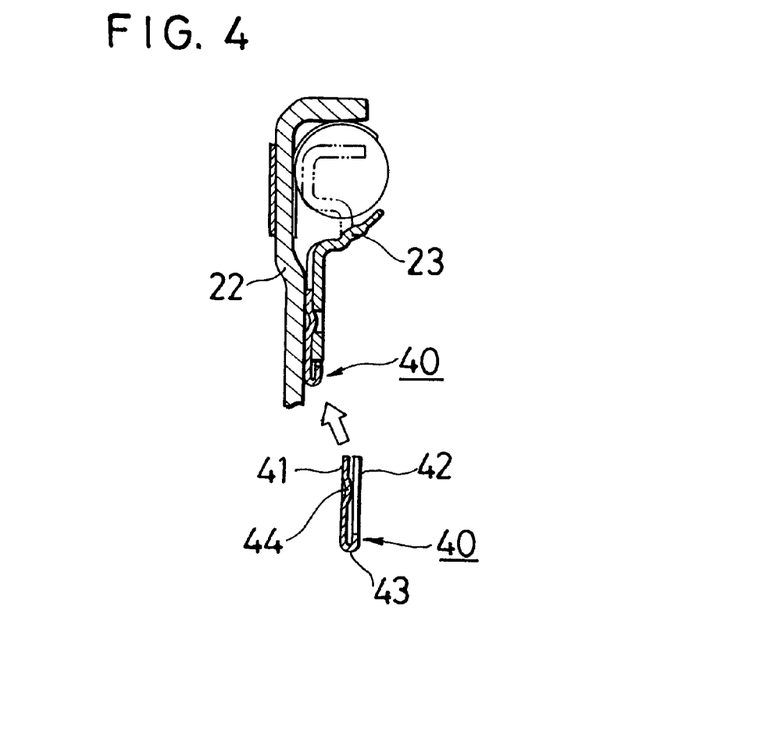
FIG. 4 is a fragmentary cross-sectional view of the piston and the weight mounted thereon.
Figure 5:
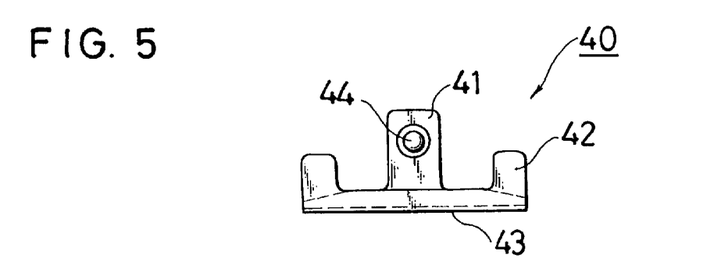
FIG. 5 is a front view of one example of the weight.
Figure 6:
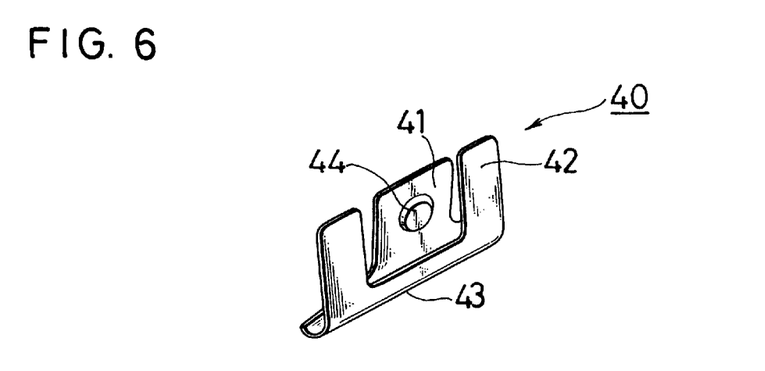
FIG. 6 is a perspective view of another example of the weight.
Figure 7:
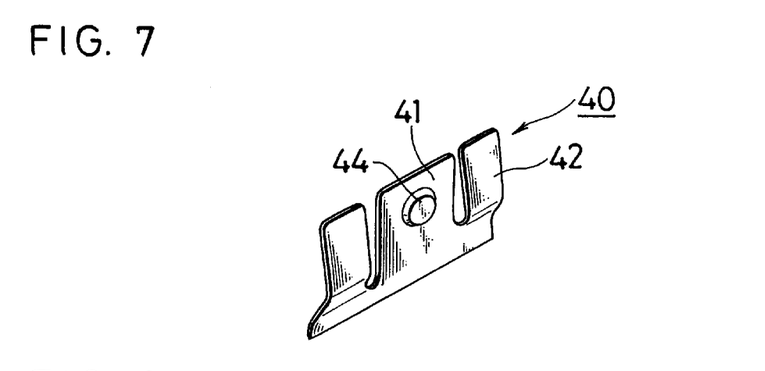
FIG. 7 is a perspective view of a further example of the weight.
Figure 8:
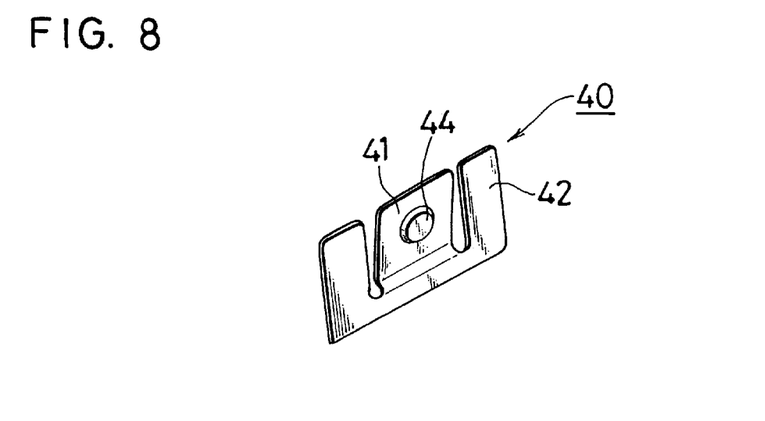
FIG. 8 is a perspective view of a still further example of the weight.

In FIG. 1, a retainer plate 23 which is located at an upper position as viewed in the drawing is provided with an unbalance-correcting weight 40. Remaining three retainer plates 23' are not provided with the weight. As is shown in FIG. 3, the weight 40 is formed in a thin, turned E shape. Described specifically, a central insert portion 41 and riding portions 42—which are located on both sides of the central insert portion 41, respectively—are folded at a folded portion 43 so that the weight 40 presents an E shape as a whole. Designated at numeral 44 is a dowel which is fitted in a hole 23C of the retainer plate 23.

As is depicted in FIGS. 1 and 3, a raised portion 23A is formed in the retainer plate 23. This raised portion 23A protrudes in a direction away from the piston. When the insert portion 41 is inserted into a space between the raised portion 23A of the retainer plate 23 and the piston 22, the riding portions 42 are brought into close contact with the retainer plate 23 on both sides of the raised portion 23A. As a consequence, the weight 40 is fixed on the retainer plate 23 to correct unbalance.

FIGS. 5 through 8 illustrate the examples of the weight 40. By changing the dimensions and shape of the weight 40 in various ways, the weight level of the weight itself can be changed to give a desired quantity of correction.

Figure 9:
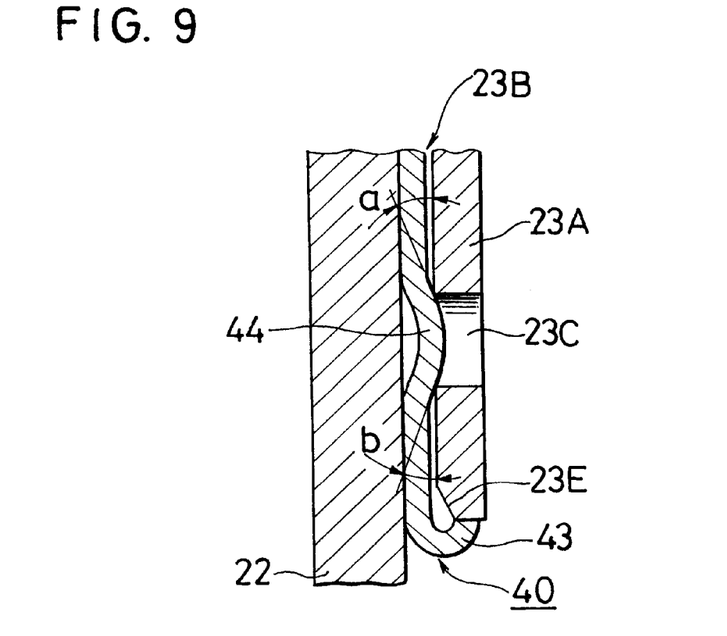
FIG. 9 is a cross-sectional view showing a mounted state of a weight.
Figure 10:
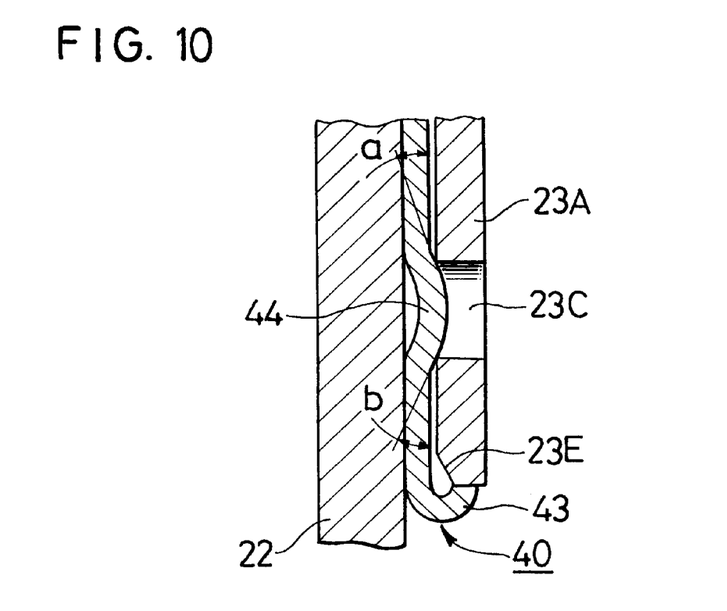
FIG. 10 is a cross-sectional view showing a mounted state of another weight.
Figure 11:
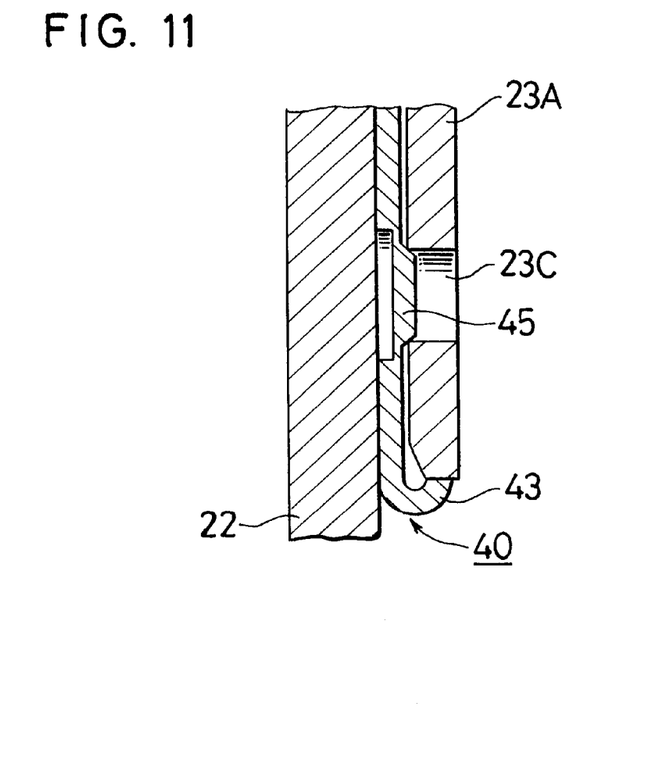
FIG. 11 is a cross-sectional view showing a mounted state of a further weight.
Figure 12:
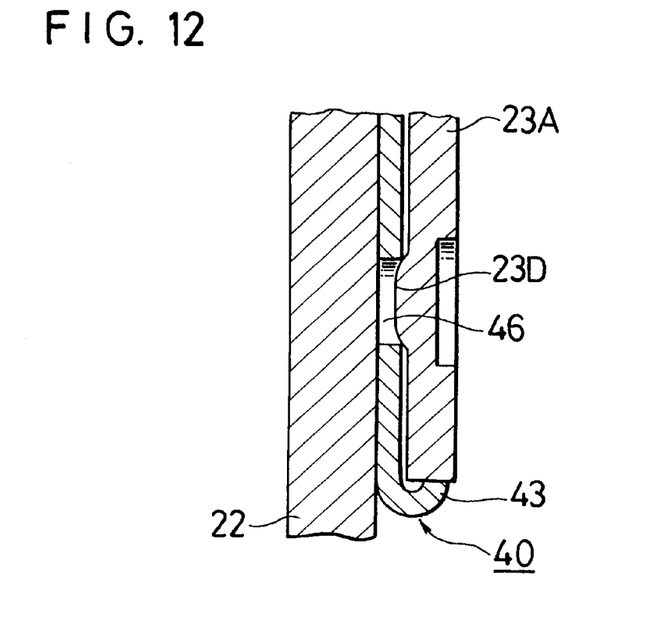
FIG. 12 is a cross-sectional view showing a mounted state of a still further weight.

In each of FIGS. 9 through 12, the state of an insert portion 41 inserted in a space 23B between the raised portion 23A and the piston 22 is illustrated. In FIGS. 9 and 10, the dowels 4 fitted in the corresponding holes 23C of the retainer plates 23 are different from each other in inclination. In FIG. 9, upper and lower inclinations a,b of the dowel are equal to each other. In FIG. 10, on the other hand, a lower inclination b is greater than an upper inclination a. In FIG. 11, a dowel 45 does not have a smoothly-curved profile but presents a trapezoidal profile. In contrast, a bead 23D is formed on the rear wall of the raised portion 23A of the retainer plate in FIG. 12, and is fitted in a hole 46 bored through the insert portion 41.

The cross-sectional views of FIGS. 2, 4, 9, 12, etc. all show cross-sections cut through the centers of the insert portions 41, respectively. In each of these drawings, the riding portions 42 are located on both sides of the raised portion 23A of the retainer plate 23 and are in close contact with the front surface of the retainer plate, so that the raised portions are not visible in the drawing.

Figure 15:
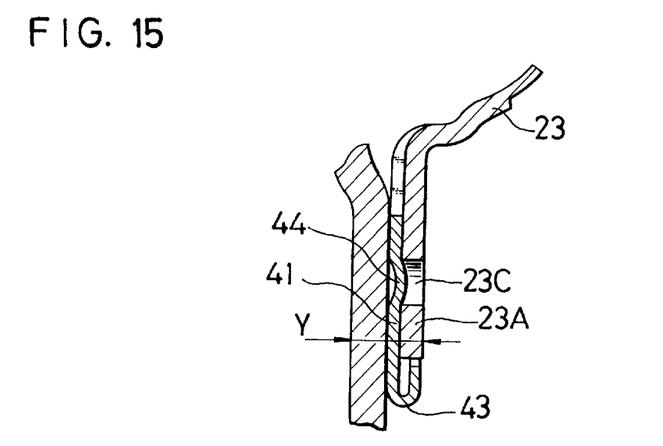
FIG. 15 is similar to FIG. 14 but is a cross-sectional view showing a mounted state of a weight according to the present invention.

FIGS. 14 and 15 illustrate a difference in mounting dimensions between a conventional balancer and a balancer according to the present invention. According to the conventional balancer shown in FIG. 14, a front portion 51 of a clip 50 protrudes over a front surface of the retainer plate 23 and moreover, a groove 22A must be formed in the piston 22 in order to insert an insert portion 52 between the piston 22 and the retainer plate 23. Accordingly, an overall mounting width X becomes large. In the present invention, on the other hand, riding portions are in close contact with the front surface of the retainer plate 23 on both sides of a raised portion, respectively, thereby requiring only a smaller mounting width Y as shown in FIG. 15.

In addition, as is illustrated in FIGS. 9 through 11, the retainer plate 23 is provided with a bevelled portion 23E at its lower edge portion along which the insert portion of the unbalance-correcting weight 40 is inserted. The bevelled portion 23E further facilitates the insertion of the insert portion.

This application claims the priority of Japanese Patent Application No. HEI 9-089528 filed Jul. 4, 1997, which is incorporated herein by reference.

We claim:

1. In a balancer for a damper in a lock-up clutch, the improvement wherein an unbalance-correcting weight to be mounted on a retainer plate of said lockup clutch is in a folded form of an E shape formed of a central insert portion and riding portions located on opposite sides of said central insert portion, said retainer plate is provided with a raised portion formed therein, and said unbalance-correcting weight is mounted on said retainer plate by inserting said insert portion outwardly in a radial direction between a piston of said lock-up clutch and said raised portion of said retainer plate.

2. A balancer according to claim 1, wherein said insert portion is provided with a dowel to be fitted in a guide hole formed in said retainer plate.

* * * * *